United States Patent [19]

Dupart et al.

[11] Patent Number: 6,068,863
[45] Date of Patent: *May 30, 2000

[54] PREPARATION OF MICROWAVEABLE BREAD PRODUCTS

[75] Inventors: Pierre Dupart, Zuerich/Witikon, Switzerland; Urban Nilson, Lund, Sweden; Claude Sartorio, Lake Bluff, Ill.

[73] Assignee: Nestec S.A., Vevey, Switzerland

[*] Notice: This patent is subject to a terminal disclaimer.

[21] Appl. No.: 08/975,371

[22] Filed: Nov. 20, 1997

[30] Foreign Application Priority Data

Nov. 21, 1996 [EP] European Pat. Off. ............ 96203263

[51] Int. Cl.$^7$ ...................................................... A21D 8/02
[52] U.S. Cl. .............................. 426/18; 426/28; 426/94; 426/549
[58] Field of Search ........................... 426/28, 549, 18, 426/64, 534, 533, 650, 94

[56] References Cited

U.S. PATENT DOCUMENTS

| | | | |
|---|---|---|---|
| 4,010,073 | 3/1977 | Drake | 426/64 |
| 4,116,772 | 9/1978 | Vidal et al. | 426/64 |
| 4,990,343 | 2/1991 | Haarasilta et al. | 426/28 |
| 5,110,614 | 5/1992 | Corbin et al. | 426/555 |
| 5,789,003 | 9/1998 | Desjardins et al. | 426/18 |

FOREIGN PATENT DOCUMENTS 9632026  10/1996  WIPO.

*Primary Examiner*—Lien Tran
*Attorney, Agent, or Firm*—Vogt & O'Donnell, LLP

[57] ABSTRACT

Bread products are prepared by treating a starch material in water with a carbohydrase so that the carbohydrase liquefies the starch material and so that starch of the starch material is gelatinized, combining the product of the treatment with water, a starch material, a vegetable oil and lecithin so that an emulsion is obtained, heating the emulsion to gelatinize starch material and to stabilize the emulsion, drying the emulsion to obtain a powder and combining the powder with wheat flour, sugar, raising agent and water ingredients to obtain a dough, and thereafter, the dough may be stored at a temperature of from −40° C. to +10° C., or the dough may be baked and the baked product also may be stored at a temperature of from −40° C. to +10° C.

20 Claims, No Drawings

PREPARATION OF MICROWAVEABLE BREAD PRODUCTS

BACKGROUND OF THE INVENTION

The present invention relates to preparation of bread products, particularly to products which may be heated by microwaves to be ready-to-eat, and to treatments of starch material to prepare products with treatments which include treatments of starch material with a carbohydrase and with heat to gelatinize starch.

It is known that the texture of traditional breading products deteriorates when they are heated by microwave. The reason for this is that, in these products, during heating by microwave, the distribution of the water content is heterogeneous and these products consequently have a rubbery texture which is hard to chew and a surface which is either soggy or dry.

U.S. Pat. No. 5,110,614 describes, on the one hand, a premix, and on the other hand, a mix, in dried form, which are intended to be added to ingredients traditionally used in the manufacture of breading products. On account of the addition of this premix or of this mix, these breading products can be heated by microwave. The premix comprises 0–20 parts by weight of milk powder, 7–55 parts by weight of fat and 0–5 parts by weight of powdered whole egg. 22–55 parts by weight of durum wheat flour and 0–20 parts by weight of dextrose are then incorporated into this premix. The mix described comprises 46–80 parts by weight of flour, 4–22 parts by weight of fat, 6–11 parts by weight of proteins, 0–12 parts by weight of dextrose, 0–12 parts by weight of sugar, 0–3 parts by weight of corn starch, 0–3 parts by weight of monoglycerides and/or lecithin, 0–3 parts by weight of salt and 0–2 parts by weight of micro-crystalline cellulose. In the preparation of this mix, the proteins and the fat are combined, after which the flour and the other ingredients are added.

SUMMARY OF THE INVENTION

The aim of the present invention is to provide a simple and rapid process which makes it possible to prepare microwaveable breading products which have physical properties and organoleptic qualities similar to those of traditional breading products heated in a conventional oven.

To that end, in the process for the preparation of a breading product according to the present invention, a starchy starting material is liquefied in the presence of water with at least one carbohydrase, this liquefied starchy starting material is added to water, vegetable oil, a starchy starting material and lecithin, so as to obtain an emulsion, this emulsion is heat-treated and dried so as to obtain a powder, and the powder is combined and mixed with ingredients comprising wheat flour, sugar, a raising agent and water to obtain a dough. In particular, 3–10 parts by weight of that powder are incorporated into a mix comprising 40–57 parts by weight of wheat flour, not more than 6 parts by weight of sugar, not more than 2 parts by weight of salt, not more than 3 parts by weight of raising agent, not more than 2 parts by weight of emulsifier, not more than 2 parts by weight of alpha-amylase, 15–35 parts by weight of water, not more than 10 parts by weight of fat, not more than 3 parts by weight of gluten and not more than 4 parts by weight of milk, in order to obtain a homogeneous dough.

It has been observed, surprisingly, that the preparation process according to the present invention makes it possible to prepare breading products which may be heated by microwave and whose golden appearance, crusty surface, soft internal texture, taste and aroma are similar to those of traditional breading products heated in a conventional oven. This is because the present invention makes it possible, in particular, to overcome the problems of heterogeneity of the distribution of the water content in such products, during heating by microwave.

The present invention also includes bread products obtained by carrying out the process of the invention, including baked products which have, upon heating by microwaves to provide a ready-to-eat product, a golden appearance, a crusty surface texture and a soft internal texture.

DETAILED DESCRIPTION OF THE INVENTION

In that description, the expression "microwaveable product" is used to denote a product which may be heated by microwave.

Furthermore, in this description, the expression "starchy starting material" is used to denote, in particular, a flour or meal from durum wheat, from *Triticum aestivum* wheat, from rice, from barley or from corn, and in the claims the term "starch material" denotes those materials.

Lastly, in this description, the expression "breading product" is used, in particular, to denote an uncooked, precooked or cooked dough intended for the manufacture of snacks, sandwiches or desserts, for example.

In the preparation process according to the present invention, a starchy starting material is thus liquefied in the presence of water with at least one carbohydrase, in order to gelatinize the starchy starting material and to reduce its viscosity. The starchy starting material may be liquefied with 0.05–0.5% of alpha-amylase at 50–85° C. for 20–90 min, for example.

After the starchy starting material has been liquefied, a drying step may be carried out in order to obtain a powder and to promote more intimate mixing of this liquefied starchy starting material with the other ingredients, for example.

This liquefied starchy starting material may then be added to water, vegetable oil, a starchy starting material and lecithin, in order to obtain an emulsion. 10–40% of this liquefied starchy starting material may be added, in dried or liquid form, to 20–50% of starchy starting material, not more than 40% of water, not more than 5% of vegetable oil and not more than 0.6% of lecithin.

This emulsion is heat-treated in order to stabilize it since, during this heat-treatment, the starch grains of the starchy starting material gelatinize, and the lecithin, which is an emulsifier, acts as a surfactant by binding the vegetable oil to the starch grains. This emulsion may be heat-treated at 115–140° C. for 20 s to 2 min, for example. It may, in particular, be heat-treated by injection of steam.

Next, the stabilized emulsion is dried in order to obtain a powder. It is preferably dried on a cylinder heated with saturated steam at 70–195° C. for 5–30 s. It may also be dried by spraying or by freeze-drying, for example.

3–10 parts by weight of the powder obtained by drying the emulsion are incorporated into a mixture comprising 40–57 parts by weight of wheat flour, not more than 6 parts by weight of sugar, not more than 2 parts by weight of salt, not more than 3 parts by weight of raising agent, not more than 2 parts by weight of emulsifier, not more than 2 parts by weight of alpha-amylase, 15–35 parts by weight of water, not more than 10 parts by weight of fat, not more than 3 parts by weight of gluten and not more than 4 parts by weight of milk, in order to obtain a homogeneous dough.

This dough may then be baked in a conventional oven at 200–250° C. for 10–45 min or in a band cooker at 190–225° C. for 2–20 min, for example.

Before or after the baking step, pieces of meat or fish, a sauce, whole and/or pieces of fruit or vegetable, cheese, spices and/or cereals may be placed inside or on the breading product, for example, which provides a composite product.

Pieces of meat or fish, a sauce, whole and/or pieces of vegetable, cheese, spices and/or cereals, for example, may be placed on or inside the breading product if it is desired to obtain a savoury breading product according to the present invention.

The meat may be beef, chicken, turkey, veal, pork or delicatessen meat products, such as ham, sausage or salami, for example.

The fish may be cod, salmon, sole or coley, for example.

The pieces of meat or fish may be added precooked or uncooked, for example. The meat or fish may also be added ground in a sauce, for example.

The whole and/or pieces of vegetable may be tomatoes, peppers, mushrooms, sweetcorn, onions, carrots, garden peas, celery, beans, potatoes or broccoli, for example.

The whole and/or pieces of vegetable may be blanched or precooked before they are added to the breading product, for example. They may also be added in the form of a puree, for example.

The cheese may be gruyère, mozzarella, cheddar or emmenthal, for example.

The sauce may be mustard, ketchup, tomato sauce or a white sauce, for example.

The cereals may be pearl barley or rice which may be precooked, or sesame or poppy, for example.

The spices may be pepper, rosemary, sage, ginger, thyme, chilli pepper or cumin, for example.

Whole and/or pieces of fruit, a sauce, spices and/or cereals, for example, may be placed on or inside the breading product if it is desired to prepare a sweet breading product according to the present invention.

The fruit may be apples, pears, cherries, pineapple or apricots, for example.

The sauce may be a vanilla sauce, a caramel sauce or a chocolate sauce, for example.

The spices may be cinnamon or vanilla, for example.

The cereals may be pearl barley or rice which may be precooked, for example.

The breading product may also be stored, before or after the baking step, at a temperature of from −40° C. to +10° C., for example.

The breading product may be heated by microwave for 20 s to 10 min, for example in order to obtain a ready-to-eat breading product with a soft texture. The breading product according to the present invention may also be heated in a conventional oven at 110–200° C. for 10–40 min or in a toaster for 1–2 min, for example.

EXAMPLES AND PROCEDURES FOR COMPARISONS

The process and the breading product according to the present invention are described in greater detail in the examples below, which are preceded by a test for analysis of the texture and by a comparative example. The percentages are given by weight except where otherwise indicated.

Test for Analysis of the Texture

To analyse the texture of a breading product baked and heated by microwave, the maximum force to be applied in order to break it and the energy corresponding to this force are measured using a texture analyser equipped with a force meter, described by Dahle, L. K. and Sambuchi, N. (Application of a devised universal, testing machine procedures for measuring texture of bread and jam-filled cookies, Cereal Food World, 32-7, 1987).

To perform the test, the breading product is placed on a circular plate whose centre is hollowed out as a disc 40 mm in diameter, and a piston having a circular base 30 mm in diameter is pressed on the upper face of the breading product, while at the same time measuring the force required to break it and the corresponding energy.

The force required to break a breading product according to the present invention and the energy corresponding to this force are measured and these measurements are compared with those made on a traditional breading product.

Comparative Example

A breading product according to the preparation process of the present invention is thus prepared as described in Example 1, until bread rolls are obtained, which are then stored at −18° C.

For comparision, a traditional breading product is prepared. To do this, a mixture containing 56% *Triticum aestivum* wheat flour, 2.5% sucrose, 1.5% salt, 1.9% powdered skimmed milk, 1% gluten, 28.2% water, 4.7% sunflower oil, 2.2% yeast, 1% enzyme and 1% emulsifer is prepared, in order to obtain a homogeneous dough.

This dough is divided into 30 g rolls of dough which are baked at 180° C. for 15 min in a conventional oven, in order to obtain small bread rolls, which thereafter are stored at −18° C.

After storage at −18° C., a bread roll obtained by carrying out the preparation process according to the present invention and the traditional bread roll are heated by microwave for 1 min.

Next, the force applied which is required to break the bread roll obtained by carrying out the preparation process according to the present invention and the traditional bread roll, and the energy corresponding to these forces, are measured immediately after heating by microwave and 15 min after heating by microwave. The values measured are then compared.

The values of the force applied which is required to break the bread roll obtained by carrying out the preparation process according to the present invention and the traditional bread roll, immediately after heating by microwave, and the energy values corresponding to these forces are given in Table I.

TABLE I

| Bread roll | Force applied (N) | Energy (J) |
| --- | --- | --- |
| according to the present invention | 3.66 | 0.05 |
| traditional | 5.06 | 0.08 |

These measurements set forth in Table I demonstrate that the traditional bread roll is harder, immediately after heating by microwave, than the bread roll according to the present invention since a larger force needs to be applied to break the traditional bread roll.

The values of the force applied which is required to break the bread roll obtained by carrying out the process according to the present invention and the traditional bread roll, 15 min after heating by microwave, as well as the values of the energy corresponding to these forces, are given in Table II.

TABLE II

| Bread roll | Force applied (N) | Energy (J) |
| --- | --- | --- |
| according to the present invention | 6.55 | 0.14 |
| traditional | 10 | 0.17 |

These measurements set forth in Table II demonstrate that if they are left to cool for 15 min after heating by microwave, the traditional bread roll has a harder texture than the bread roll obtained by carrying out the process according to the present invention, since a larger force needs to be applied to break the traditional bread roll.

Example 1

A ham and cheese sandwich is prepared according to the preparation process of the present invention.

To do this, 199.8 kg of *Triticum aestivum* wheat flour are mixed with 286 kg of water and the mixture is liquefied with 0.2 kg of alpha-amylase at 60° C. for 30 min.

27.5% of this liquefied wheat flour is then added to 39.5% of *Triticum aestivum* wheat flour, 1.4% of palm oil, 0.4% of soybean lecithin and 31.4% of water, in order to obtain an emulsion which is stabilized by heat-treatment.

This heat-treatment is carried out by injection of steam at 131° C. for 2 min.

This stabilized emulsion is then dried on a cylinder heated with saturated steam at 170° C. for 15 s, in order to obtain a powder.

4 parts by weight of this powder are then incorporated into a mixture comprising 52 parts by weight of *Triticum aestivum* wheat flour, 2.5 parts by weight of sucrose, 1.5 parts by weight of salt, 1.9 parts by weight of powdered skimmed milk, 1 part by weight of gluten, 28.2 parts by weight of water, 4.7 parts by weight of sunflower oil, 2.2 parts by weight of yeast, 1 part by weight of enzyme and 1 part by weight of emulsifier, in order to obtain a homogeneous dough.

This dough is divided into 30 g rolls which are baked at 180° C. for 15 min in a conventional oven, in order to obtain bread rolls.

These bread rolls are sliced and a filling comprising 61.5% of diced gruyere, 20.4% of cooked ham, 0.4% of salt, 0.07% of pepper, 11.3% of fresh leeks cut into rings, 3.3% of dehydrated onion, 2% of powdered cheese and 1% of ham-type flavouring is then placed inside, in order to make ham and cheese sandwiches.

The sandwiches are then stored at −18° C.

A consumer can then heat the sandwiches by microwave for 2 min, in order to obtain ham and cheese sandwiches whose crumb has a soft texture.

Example 2

The process is carried out as described in Example 1, except that a drying step is carried out after the liquefaction step.

To do this, after the *Triticum aestivum* wheat flour has been liquefied, it is dried on a cylinder heated with saturated steam at 135° C. for 12 s, in order to obtain a powder.

Example 3

Tomato sandwiches are prepared.

To do this, the process is performed as described in Example 1, except that a tomato filling is placed inside the bread rolls.

After the baking step, the bread rolls are sliced open and a filling prepared from 35% of tomato concentrate, 0.5% of salt, 0.1% of ground white pepper, 0.1% of powdered garlic, 1% of powdered roast onion, 14.6% of potato flakes, 5.2% of maltodextrin and 43.5% of powdered cheddar cheese is placed inside, in order to make tomato sandwiches.

The sandwiches are then stored at −18° C.

A consumer can then heat the sandwiches by microwave for 2 min in order to obtain tomato sandwiches whose crumb has a soft texture.

Example 4

Strawberry-flavoured bread rolls are prepared.

To do this, the process is performed as described in Example 1, except that a strawberry-flavoured filling is placed inside the bread rolls.

A filling prepared from 27.1% of sugar, 20% of dextrose, 0.3% of citric acid, 7% of water, 34% of fat, 0.5% of soybean lecithin, 0.1% of powdered strawberry flavouring, 10% of powdered yogurt and 1% of liquid strawberry flavouring is thus placed inside the sliced bread rolls.

The sandwiches are then stored at −18° C.

A consumer can then heat the strawberry-flavoured bread rolls by microwave for 2 min in order to obtain bread rolls whose crumb has a soft texture.

We claim:

1. A process for preparation of a bread product comprising:

treating a starch material in water with a carbohydrase so that the carbohydrase liquefies the starch material and so that starch of the starch material is gelatinized to obtain a treated starch product;

combining the treated starch product with water, a starch material, a vegetable oil and lecithin so that an emulsion is obtained;

heating the emulsion so that starch is gelatinized and to obtain a stabilized heat-treated emulsion;

drying the heat-treated emulsion to obtain a powder; and combining and mixing the powder with, by weight, from 40 parts to 57 parts wheat flour and with from 15 to 35 parts water and with sugar, salt, a raising agent, an emulsifier, alpha-amylase, a fat, gluten and a milk to obtain a bread product dough, but combining so that, by weight, the powder is combined and mixed with not more than 6 parts of the sugar, not more than 2 parts of the salt, not more than 3 parts of the raising agent, not more than 2 parts of the alpha-amylase, not more than 10 parts of the fat, not more than 3 parts of the gluten and not more than 4 parts of the milk.

2. A process according to claim 1 wherein the treated starch product, water, starch material, vegetable oil and lecithin are combined to obtain an emulsion which comprises, by weight, from 10% to 40% of the liquefied starch product, from 20% to 50% of the starch material, not more than 40% added water, not more than 5% vegetable oil and not more than 0.6% lecithin.

3. A process according to claim 1 or 2 further comprising drying the treated starch product to obtain a dried treated product for combining with the water, starch material, vegetable oil and lecithin to obtain the emulsion.

4. A process according to claim 1 wherein the starch material treated with the carbohydrase and the starch material combined with the treated starch product is selected from the group consisting of a flour and a meal of a starch material selected from the group consisting of *Triticum aestivum* wheat, durum wheat, rice, barley and corn.

5. A process according to claim 1 wherein the starch material treated with the carbohydrase comprises *Triticum aestivum* wheat.

6. A process according to claim 1 or 5 wherein the starch material combined with the liquefied starch product comprises Triticuin aestivum wheat.

7. A process according to claim 1 wherein the carbohydrase is alpha-amylase.

8. A process according to claim 1 wherein the carbohydrase is alpha-amylase and the starch material treated with the alpha-amylase is treated at a temperature of from 50° C. to 85° C. for from 20 minutes to 90 minutes and wherein, by weight, the alpha-amylase is present in an amount of from 0.05% to 0.5%.

9. A process according to claim 1 wherein the emulsion is heated at a temperature of from 115° C. to 140° C. for from 20 seconds to 2 minutes.

10. A process according to claim 1 wherein the heat-treated emulsion is dried on a cylinder heated with saturated steam and at a temperature of from 70° C. to 195° C. for from 5 seconds to 30 seconds.

11. A process according to claim 1 further comprising storing the bread product dough at a temperature of from −40° C. to +10° C.

12. A process according to claim 1 further comprising baking the bread product dough to obtain a baked bread product.

13. A process according to claim 12 further comprising storing the baked product for a time at a temperature of from −40° C. to +10° C.

14. A process according to claim 12 further comprising, prior to baking, placing on the bread product dough a food product selected from the group consisting of a sauce, cheese, meat, fish, fruit, vegetable, cereal and spice to obtain a composite product.

15. A process according to claim 12 further comprising placing on the baked product a food product selected from the group consisting of a sauce, cheese, meat, fish, fruit, vegetable, cereal and spice to obtain a composite product.

16. The bread product dough product of the process of claim 1 or 2.

17. The bread product dough product of the process of claim 5.

18. The dough product of the process of claim 6.

19. The baked bread product of the process of claim 12.

20. A composite product of claim 15 or 16.

* * * * *